2,734,903

THIOCYANIC ESTERS OF PYRIDINE OXIDES

Frederick Leonard, Yonkers, N. Y., assignor to Nepera Chemical Co., Inc., Yonkers, N. Y., a corporation of New York No Drawing. Application August 23, 1954,
Serial No. 451,699

9 Claims. (Cl. 260—294.8)

This invention relates to certain pyridine-1-oxides and relates more particularly to substituted pyridine oxides of the following formula:

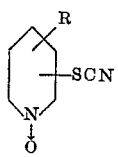

wherein R is a hydrogen, nitro, amino, lower alkylamino or lower acylamino group. These compounds are highly active fungicides, and are also useful as antibacterial substances.

While many antifungal agents are available and widely utilized for the control of various fungus organisms, the usefulness of many of these known compounds is limited. A particular disadvantage which is encountered is the limited antifungal spectrum which many of these compounds exhibit, which is observed in the limited or complete inactivity which these compounds have against certain fungi. For example, many agents which are antifungal with respect to certain organisms do not exhibit any appreciable antifungal activity against *Microsporum audouini*, a fungus which is, accordingly, difficult to control.

It is, therefore, an important object of this invention to provide certain novel pyridine-1-oxides which are useful as antifungal agents against a relatively wide group of fungi, and especially against *Candida albicans*, *Aspergillus fumigatus*, *Sporotrichum schenkii*, *Microsporum audouini* and *Trichophyton mentagrophytes*. These compounds are effective bactericidal agents against *Alkaligenes faecalis*.

Other objects of this invention will appear from the following detailed description.

The novel anti-fungal pyridine-1-oxide compounds of my invention may be obtained by converting a suitable intermediate pyridine compound having a substituted group or groups which may be readily replaced, to the corresponding 1-oxide by reacting said substituted pyridine compound with a per acid such as perbenzoic acid, peracetic acid, perphthalic acid, permono-sulfonic acid or hydrogen peroxide preferably in glacial acetic acid, and then converting the pyridine-1-oxide to the novel substituted compounds described above.

For example, in accordance with the procedure described, a halo-pyridine such as 2-brompyridine may be reacted with peracetic acid to form 2-brompyridine-1-oxide and the latter reacted with potassium thiocyanate or other alkali-metal thiocyanate to yield 2-thiocyano-pyridine-1-oxide. Similarly, a nuclearly attached amino group may be replaced by the thiocyano group by diazotizing the amino group and then reacting the resulting diazonium halide with a concentrated solution of potassium thiocyanate.

In the preparation of an amino-thiocyanopyridine-1-oxide, such as 4-amino-2-thiocyanopyridine-1-oxide, the latter is readily obtained by converting 2-brompyridine to the corresponding pyridine-1-oxide using peracetic acid, nitrating the 2-brompyridine-1-oxide to form 4-nitro-2-brompyridine-1-oxide, reducing the nitro group to an amino group and replacing the 2-brom substituent with a thiocyano group. In lieu of a free amino group, the latter may be acylated or alkylated. For example, my novel compounds may be substituted by an acetylamino or propionyl amino group or by a dimethyl, diethyl amino or other lower alkyl amino group.

In order further to illustrate my invention but without being limited thereto, the following examples are given:

Example I 9 parts by weight of the hydrochloride of 2-brompyridine-1-oxide are dissolved in about 160 parts by weight of absolute ethanol and neutralized with an alcoholic solution of potassium hydroxide. The precipitate of potassium chloride which forms is filtered off and the filtrate combined with a solution of 5 parts by weight of potassium thiocyanate in about 40 parts by weight of absolute ethanol. The reaction mixture is heated and maintained at reflux temperature for about three hours, with stirring. The reaction mixture is filtered hot, and on cooling, a crystalline precipitate of 2-thiocyanopyridine-1-oxide is obtained. The product is filtered off and is recrystallized twice from alcohol. This compound has a melting point of 158–160° C. Nitrogen analysis for $C_6H_4N_2OS$ is: Calculated—N=18.4%; found—N=18.6%.

Example II 10.8 parts by weight of 2-bromo-4-nitropyridine-1-oxide are dissolved in about 120 parts by weight of absolute ethanol and a solution of 4.85 parts by weight of potassium thiocyanate in 24 parts by weight of absolute ethanol is added. After heating under reflux for two and one-half hours, with stirring, the reaction mixture is filtered hot and then allowed to cool. The crude crystalline material which separates is filtered off and recrystallized from alcohol several times. The purified 4-nitro-2-thiocyanopyridine-1-oxide obtained melts at 180–181° C. Analysis for $C_6H_3N_3O_3S$ is:

|  | %C | %H | %N | %S |
|---|---|---|---|---|
| Calculated: | 36.54 | 1.53 | 21.3 | 16.27 |
| Found: | 36.9 | 1.77 | 20.7 | 15.87 |

Example III 5 parts by weight of 4-aminopyridine-1-oxide are dissolved in aqueous hydrochloric acid, cooled to about 5° C. and a solution of 3.6 parts by weight of sodium nitrite in 100 parts by weight of water is added. A concentrated aqueous solution of 5 parts by weight of potassium thiocyanate is added to the diazonium salt solution and the mixture then heated on the steam bath for one hour. The reaction is neutralized with 6N. aqueous sodium hydroxide and concentrated to a syrupy residue by removal of water. The thick residue is extracted with acetone and crystals of 4-thiocyanopyridine-1-oxide crystallize from the hot aqueous acetone extract of cooling. The crude product is purified by recrystallization from acetone and the 4-thiocyanopyridine-1-oxide obtained melts sharply at 130–132° C.

It is understood that the foregoing detailed description is given merely by way of illustration and that many variations may be made therein without departing from the spirit of my invention.

Having described my invention, what I desire to secure by Letters Patent is:

1. Compounds of the following formula:

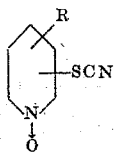

wherein R is a member of the group consisting of hydrogen, nitro, amino, lower acylamino and lower alkylamino groups.

2. The compound 2-thiocyanopyridine-1-oxide.
3. The compound 4-nitro-2-thiocyanopyridine-1-oxide.
4. The compound 4-thiocyanopyridine-1-oxide.
5. The compound 4-amino-2-thiocyanopyridine-1-oxide.
6. The compound 4-acetylamino-2-thiocyanopyridine-1-oxide.
7. Process for the production of a thiocyanopyridine-1-oxide, which comprises reacting a halopyridine-1-oxide with an alkali-metal thiocyanate.
8. Process for the production of 2-thiocyanopyridine-1-oxide, which comprises reacting 2-bromopyridine-1-oxide with potassium thiocyanate.
9. Process for the production of 4-nitro-2-thiocyanopyridine-1-oxide, which comprises reacting 4-nitro-2-brompyridine-1-oxide with potassium thiocyanate.

References Cited in the file of this patent

UNITED STATES PATENTS

| 2,462,433 | Searle | Feb. 22, 1949 |
| 2,686,786 | Shaw et al. | Aug. 17, 1954 |

OTHER REFERENCES

Takahashi et al.: Chem. Abst., vol. 44, col. 7320 (1950).

Takahashi et al.: Chem. Abst., vol. 45, cols. 4716–17 (1951).

Achiai et al: Chem. Abst., vol. 45, col. 8528 (1951).